United States Patent [19]
Grygera

[11] 3,795,850
[45] Mar. 5, 1974

[54] REGENERATIVE MOTOR CONTROL SYSTEM

[75] Inventor: James W. Grygera, Racine, Wis.

[73] Assignee: Eaton Corporation, Cleveland, Ohio

[22] Filed: July 26, 1971

[21] Appl. No.: 165,983

[52] U.S. Cl. .................................. 318/331, 318/257
[51] Int. Cl. .............................................. H02p 5/06
[58] Field of Search ............................. 318/331, 257

[56] References Cited
UNITED STATES PATENTS

| | | | |
|---|---|---|---|
| 3,487,279 | 12/1969 | Stringer et al. | 318/257 |
| 3,431,479 | 3/1969 | Joslyn | 318/257 |
| 3,551,782 | 12/1970 | Maynard | 318/257 X |
| 3,551,748 | 12/1970 | Maynard et al. | 318/257 X |
| 3,548,278 | 12/1970 | Sommeria | 318/257 |
| 3,541,426 | 11/1970 | Joslyn et al. | 318/257 X |
| 3,538,412 | 11/1970 | Graf et al. | 318/257 X |
| 3,564,371 | 2/1971 | Schonholzer | 318/331 X |
| 3,624,837 | 11/1971 | Albarda | 318/331 |
| 3,599,064 | 8/1971 | Friedman | 318/331 X |
| 3,422,332 | 1/1969 | Dinger et al. | 318/331 |
| 3,593,087 | 7/1971 | Pantelakis | 318/331 X |

Primary Examiner—T. E. Lynch
Attorney, Agent, or Firm—Teagno & Toddy

[57] ABSTRACT

Motor control system in which regenerative bridge is conditioned to be conductive when the gating angle for SCR's in the bridge for operating in a motoring direction is such that the SCR's will not fire because of the CEMF of the motor and the regenerative bridge becomes conductive only if the armature current is zero. The CEMF of the motor is compared with the error signal to determine whether the triggering pulses are at a phase which will fire the forward bridge.

9 Claims, 9 Drawing Figures

REGENERATIVE MOTOR CONTROL SYSTEM

The present invention relates to a circuit for energizing a motor in which the motor is energized from a cyclic power source by periodically firing a conductive device such as an SCR and more particularly to such a system in which regenerated current is returned to the power system.

In a motor control system of this type, the conduction of an SCR rectifier bridge is controlled in response to an error signal by varying the phase in a periodic, e.g., an alternating current, wave at which the SCR's in the bridge are triggered. Commonly, one bridge is provided for operation in the forward direction and a second bridge for operation in the reverse direction.

Conventionally, an error signal operates to effect the firing of the SCR's of the bridge for energizing the motor to operate in the desired direction. Normally, a command signal is compared with a velocity feedback signal from the motor to provide the error signal whose magnitude determines the phase angles of the power wave at which the SCR's will be triggered. In this type of system, SCR's in the bridge for operating the motor in the reverse direction have been fired when the motor is being driven by the load and is capable of operating in a motor-generating mode. This enables armature current to flow in the reverse direction providing finer motor control as well as returning power to the line. Bridges and their associated controls which operate in this manner are known as four quadrant controllers.

In four quadrant controllers, it is important that the one bridge not be triggered to conduction while current is flowing or is capable of flowing through the other bridge. Accordingly, the motor armature current has been compared with the gating signal, which determines the phase in the power wave that the motoring SCR's fire before enabling the SCR bridge for returning generated current when the motor is operating in a regenerative mode so that the regenerative bridge has not been enabled until there is no error signal and no motor armature current. This type of system has a control dead-band when changing between motoring and regenerating modes which detrimentally affects the fineness of motor control and also produces transition between the two modes of operation which is not particularly smooth.

An important aspect of the present invention is to minimize the well-known dead-band between the motoring and regenerating modes of operation in the type of motor control system in which conductive devices such as SCR's are selectively triggered at variable phase angles of the electrical waves across the conductive devices to control current flow between the power source and the motor.

A further aspect of the present invention is to provide a new and improved motor control system including a regenerative conductive device, such as an SCR, for returning power to the power source which is enabled to be fired when armature current is not flowing in the motor and when the error signal for commanding operation of the motor in the motoring direction is reduced to a magnitude less than that necessary to effect the conduction of a conductive device for conducting current in a motoring direction because of the counter electromotive force (CEMF) of the motor.

A still further object of the present invention is to provide a new and improved motor control system in which the error signal for operating the motor in the motoring direction, the counter electromotive force of the motor, and the motor armature current are compared to determine whether to enable the regenerating power converter for the motor or the motoring power converter.

Yet another object is to provide a new and improved motor control system in which there is a smooth transition between motoring and regenerating modes of operation.

Further objects and advantages of the present invention will be apparent from the following detailed description of a specific form of the preferred embodiment in which.

Figure 1:
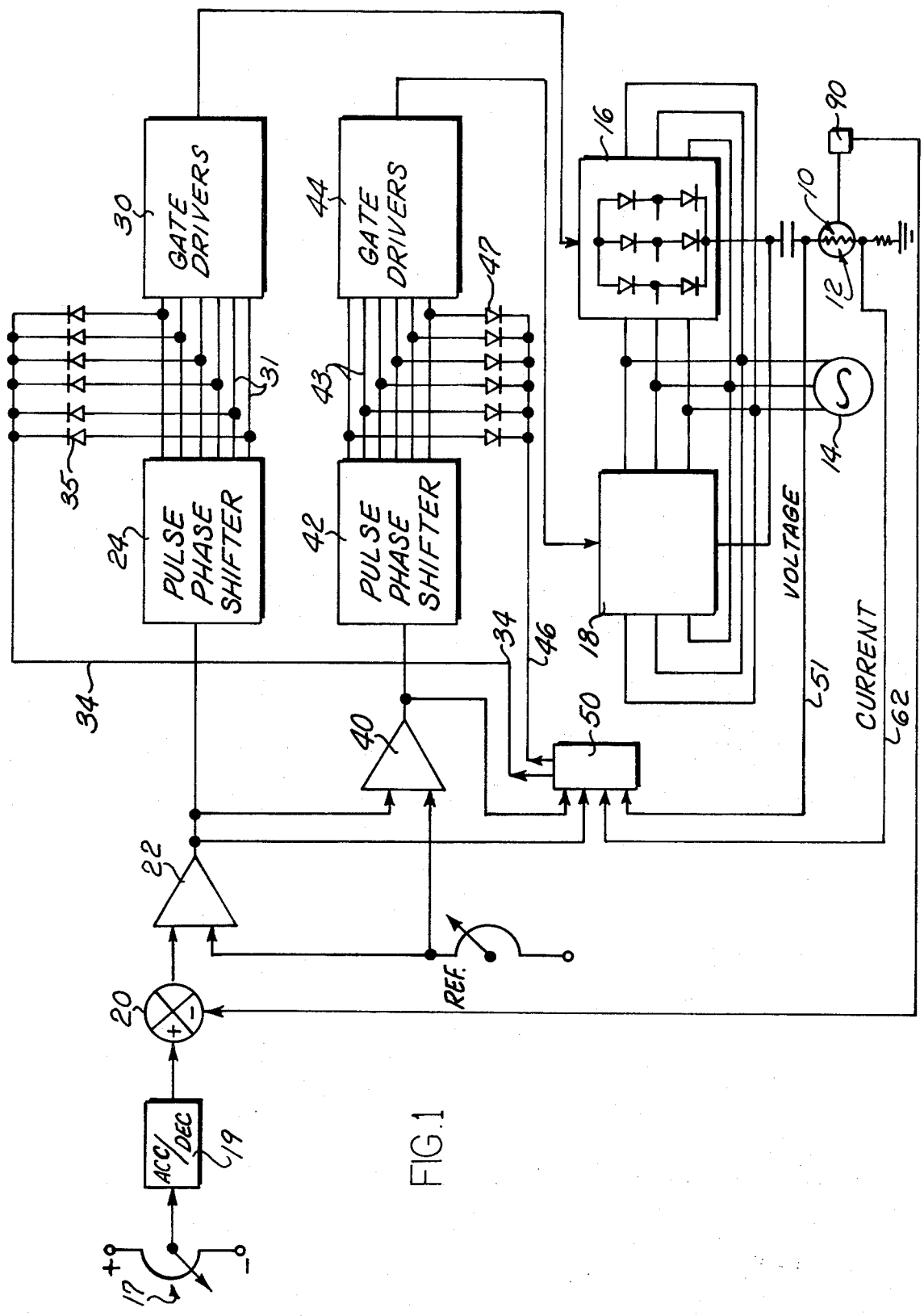
FIG. 1 is a schematic diagram of a control system embodying the present invention.

Referring to the drawing, a motor 10 has an armature 12 connected to a three phase power line 14 by forward and regenerating (reverse) conventional full wave SCR rectifier bridges 16, 18 for conducting current in forward and reverse directions, respectively, in the armature circuit.

For purposes of clarity of explanation, the drawings illustrate circuitry for operating in a forward direction only in response to a command signal.

Figure 2:
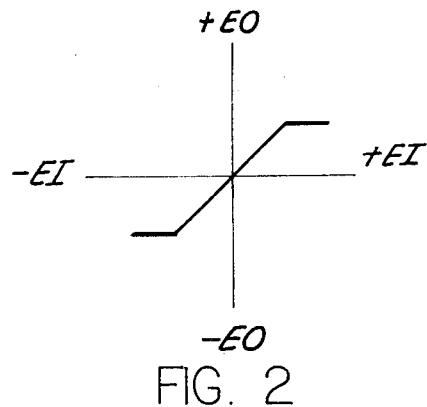
FIG. 2 is a transfer characteristic of a speed control amplifier used in FIG. 1.
Figure 3:
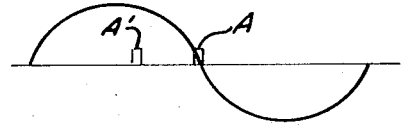
FIGS. 3, 4, 5A and 5B are firing curves for SCR's used in the circuit of FIG. 1.

In the illustrated system, the motor is operated in a forward direction in response to a command signal from a command source 17 which is applied through a conventional acceleration and deceleration limiting circuit 19 to one input of an adding circuit 20 having an output connected to one input of a speed control amplifier 22 having a transfer characteristic as shown in FIG. 2. In FIG. 2 EO is the output while EI is the input to the amplifier. The output of the amplifier is applied to a conventional phase shifting network 24 for providing pulse signals for firing the six SCR's in the forward SCR bridge 16. The pulse signals from the phase shifting network are applied to respective gate drivers in gate driving circuitry 30 over six lines 31, there being a respective gate driver for each SCR in the bridge. When the output of the amplifier is zero, the pulse signal from the phase shifter for an SCR occurs at the end of the positive lobe of the AC power wave across the SCR as is illustrated by pulse A in FIG. 3. As the signal from the amplifier increases in a positive direction, the pulse is advanced on the half-wave lobe to trigger the SCR at an advanced phase of the AC power wave and to cause the SCR to conduct current as illustrated by pulse A' in FIG. 3. The operation and construction of phase shifting circuitry for effecting the triggering of the SCR's in the forward SCR bridge at a gating angle determined by the magnitude of the signal from the amplifier 22 are well known and well understood by those skilled in the art.

The forward phase shifting network 24 can be effectively disabled by applying a low level signal to a line 34. Each of the lines 31 from the phase shifting network 24 is connected to the line 34 through a respective diode 35 and when the line 34 is at a low potential, the pulses from the phase shifting network 24 are not transmitted to the gate driving circuitry 30 and the SCR's in the forward bridge are not triggered.

The output of the amplifier 22 is also connected to the input of an inverting amplifier 40 for supplying a signal to a reverse phase shifting network 42. The reverse phase shifting network 42 operates in the same manner as the phase shifting network 24 and has a plurality of output lines 43 connected to gate driving circuitry 44 for firing the SCR's of the reverse SCR bridge 18 for conducting reverse (negative) current. Each of the output lines 43 from the negative phase shifting network 42 is connected to an inhibit line 46 by a respective diode 47 and when the inhibit line 46 is at a low level, the diode is conductive and the pulses are inhibited from the gate driver 44 and the negative current bridge is not triggered by these pulses.

Figure 4:
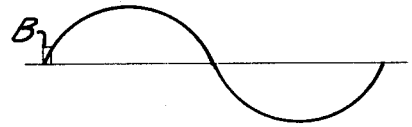

When the output of the speed control amplifier 22 is zero, the phase shifting networks 24 apply a triggering pulse to the gate circuitry at the end of the half-wave lobe of the power supply which biases the respective SCR in a forward direction in the forward bridge and phase shifting network 42 applies a triggering pulse B, see FIG. 4, to the gate drivers for the respective SCR's in the negative current bridge at the beginning of the half-wave lobe which forward biases the SCR. As the output of the amplifier 22 increases in a positive direction, the pulses applied from the forward phase shifting network to the gate driving circuitry 30 advance to fire the scr's earlier in the cycle as illustrated by pulse A in FIG. 5A. While the pulses in the forward bridge are being advanced to fire the SCR's earlier in their half wave on which they are forward biased, the input signal to the phase shifting network 42 is decreasing, that is becoming less positive, and the pulses to the SCR's are retarded so that they trigger the SCR's later in the forward biasing half-wave lobe across the SCR's in the reverse bridge as shown by pulse B in FIG. 5B.

Figure 5A:
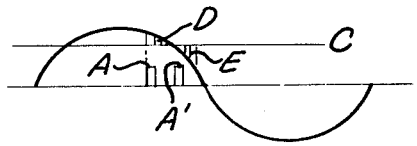
Figure 5B:
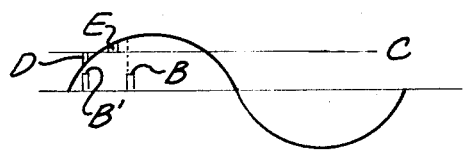

Under a motoring condition, when the motor is motoring in a forward direction, the pulse A (FIG. 5A) from the phase shifting network to an SCR in the forward bridge will be advanced in response to the positive signal from the amplifier 22 to occur at a point illustrated in FIG. 5A to effect a firing of the SCR. Since the positive signal from the amplifier 22 is inverted and applied to the phase shifting network 42, the pulse B (FIG. 5B) from the reverse or negative phase shifting circuit 42 will be shifted in the other direction and will be retarded to trigger the SCR in the reverse current bridge at a point sometime after the beginning of the half-wave lobe which is forward biasing the SCR in the forward bridge. As will be appreciated by those skilled in the art, the CEMF, whose magnitude (but not polarity) is illustrated by line c in FIG. 5, of the motor back-biases the SCR in the forward bridge and, consequently, the SCR will conduct only until the phase, or gating angle, at which the magnitude of the power wave thereacross is equal to the counter EMF at which point it will have equal voltages on the anode and cathode. The SCR will, however, because of the inductive action of the motor, continue to conduct before extinguishing for a period which is the same as the conduction period in the advance of the point at which the power wave and CEMF become equal, i.e., until area D on FIG. 5A equals area E. Since the power wave is reverse-biasing the SCR in the negative current bridge in this mode of operation during the half-cycles in which triggering pulses are applied to the respective SCR's and since the pulses from the phase shifting network 42 have been retarded to a gating angle in the half-cycles at which the power wave is greater than the CEMF of the motor, the negative current bridge will not fire, as is illustrated in FIG. 5B. It can be seen, however, that if the signal from the speed control amplifier 22 is reduced to retard the pulses applied to the forward SCR's whose condition is illustrated in FIG. 5A to a phase angle, for example A' in FIG. 5A, which is such that the CEMF is equal to the power wave or less, the forward bridge will no longer fire because of the back bias of the CEMF and if the pulses to the negative current bridge are similarly advanced in response to a decreasing signal to a point, for example B', where the CEMF is positive relative to the power wave across the respective SCR's in the negative current bridge, the negative current bridge will fire in response to a triggering pulse and will conduct current to the power line from the motor until the power wave back-biases the SCR and the SCR extinguishes itself. This condition is illustrated by the areas D and E in FIG. 5B and as will be noted in FIG. 5B, the SCR will continue to conduct after it is back-biased until the area between the curve after the back-biasing occurs is the same as the area between the curves after firing was initiated.

As will be appreciated in the foregoing description, the negative current bridge, i.e., the regenerative bridge, can be triggered to conduction in a situation where the motor is operating in a regenerative mode provided the output of the control amplifier 22 has a magnitude such that the SCR's in the forward bridge are being triggered at a phase angle which is less than the operating phase angle which is necessary to effect a conduction of the SCR's in the forward bridge in view of the back-biasing by the CEMF of the motor. However, it is necessary for the armature current to be zero to assure that a forward SCR is not conducting because of inductive current.

In accordance with the present invention, the CEMF of the motor is compared with the error signal output from the amplifier 22 and when this situation occurs and when the armature current in the motor becomes zero, the regenerative bridge is enabled by applying a high potential to the line 46. Until this time, the regenerative bridge is maintained inhibited by a low level signal to assure that there is no conduction. When the regenerative current bridge is enabled, the forward bridge is inhibited.

Enabling of the regenerative bridge and the inhibiting of the forward bridge is under the control of the logic gating processor 50. The gating logic processor 50 includes an operational amplifier 52 having a non-inverting input 52a connected to the output of speed control amplifier to provide a signal to the amplifier 52 corresponding to the output of speed control amplifier 22. The interting input 52b of the amplifier 52 has a signal applied thereto over a connection 51 which is directly proportional to armature voltage so that the output of the amplifier 52 compares the signal from the amplifier 22 with the armature voltage. Preferably, the output of the amplifier 40 is also applied to the inverting terminal 52a to, in effect, give a higher output for a given output from the amplifier 22 and to provide what is known as a bang-bang type operation.

The output of the amplifier 52 is applied to a positive hysteresis amplifier bistable circuit 54 and to a negative hysteresis amplifier bistable circuit 56. The positive bistable circuit 54 is triggered at a threshold level when the output of the amplifier 52 goes positive in response to a positive error signal from the speed control amplifier 22 and resets itself when the signal from the amplifier 52 drops to a lesser positive error signal.

Similarly, the bistable circuit 56 is triggered to its set state in response to the output of the amplifier going to a predetermined negative threshold level and is reset when the input drops to a predetermined lesser input level. The circuits 54, 56 may be referred to as Schmitt triggers and by way of example, the Schmitt trigger 54 may be triggered at positive 3.5 volts and be reset at positive 1.5 volts while the Schmitt trigger 56 may be triggered at a negative 3.5 volts and reset at a negative 1.5 volts.

Accordingly, it can be seen that when the motor is starting, a command signal to the amplifier 22 will cause a control signal at the output of the amplifier 22 which will, in turn, cause a positive output from the amplifier 52 to effect a setting of the Schmitt trigger 54. As the motor starts and comes up to speed, the CEMF signal applied to the inverting input 52b of the amplifier 52 will tend to reduce the output of amplifier 52 and when this is reduced to a level of 1.5 volts, the Schmitt trigger will be reset.

Figure 7:
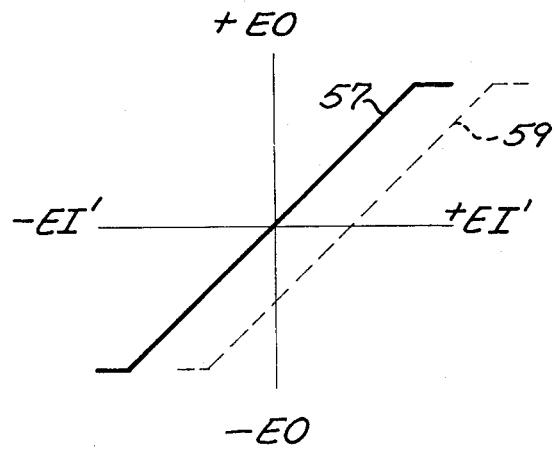
FIG. 7 is a curve showing the transfer characteristics of an amplifier of FIG. 6.
Figure 6:
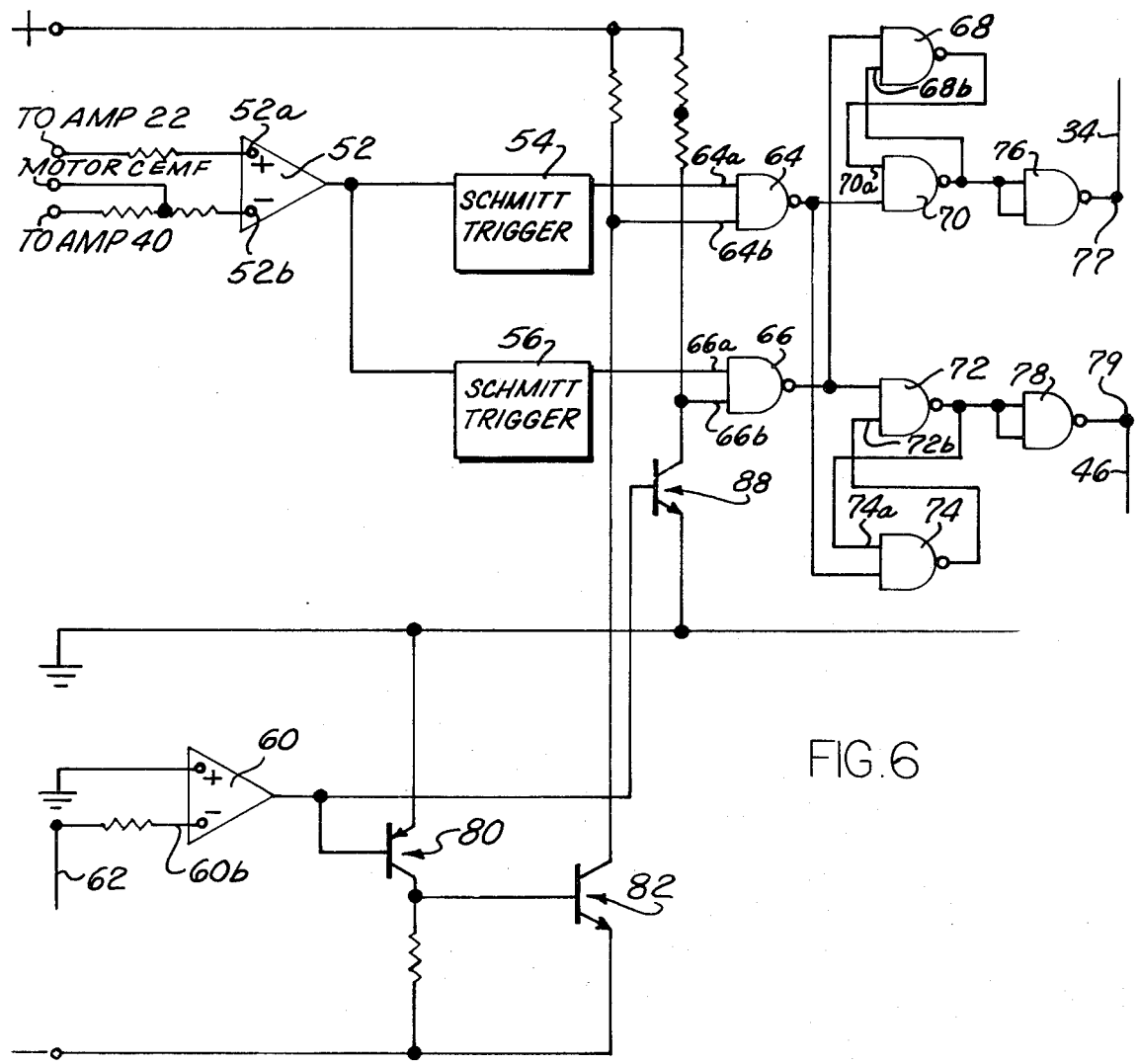
FIG. 6 is a more detailed circuit diagram of a portion of FIG. 1.

In FIG. 7, curve 57 indicates the transfer characteristic of the amplifier 52 in response to the signals from the amplifiers 22, 40 without the application of a CEMF signal and the curve 59 indicates operating conditions for a given CEMF.

When the motor is changing from a motoring condition to a regenerating condition, assuming motoring operation in the forward direction, the Schmitt trigger 54 will be set on the starting of the motor. If the output of the amplifier 52 becomes zero, the CEMF of the motor is such that the forward SCR's will no longer fire in response to a triggering signal. If forward motor current ceases and the CEMF signal becomes sufficiently large that the signal from amplifier 52 will trigger the Schmitt trigger 56, it will be safe to fire the regenerative bridge, even though the error signal to the speed control amplifier has not been reduced to zero. Consequently, on starting the motor in the forward direction and later preparing to change over to a regenerative mode, the logic sequence which is to be detected is the setting of the Schmitt trigger 54 to indicate that the motor is starting, the resetting of the Schmitt trigger 54, the setting of the Schmitt trigger 56 indicating that the CEMF signal has reached a magnitude relative to the command signal that the output of the amplifier 52 is negative, and the detection of zero armature current to assure that conduction of all forward SCR's have stopped.

The armature current is sensed in the illustrated embodiment and a signal which is dependent upon current in the armature is applied to an input of a current amplifier 60. The current signal is applied to the inverting input and a fixed reference, ground in the illustrated embodiment, is applied to the non-inverting input. The current signal is applied to the input 60b through a current signal connection 62 shown in FIG. 1. The output of the armature current sensing amplifier 60 is amplified and is applied as gate signals to NAND gates 64, 66. When amplifier 60 has no output, the signals to the gates 64, 66 are logic 1's. When the output goes negative signaling forward current, transistor 80 is turned on to turn on transistor 82 to change the signal on input 64b of gate 64 from a 1 to a 0. When the output of amplifier 60 goes positive indicating negative motor current, transistor 88 is rendered conductive to switch the input 66b of gate 66 from a logic 1 to a logic 0.

The NAND gate 64 also has an input 64a connected to the positive Schmitt trigger 54 and the gate 66 has an input 66a connected to the negative Schmitt trigger 56. Normally, the Schmitt triggers 54, 56 maintain a logic 1 to the gates 64, 66 and the logic 1's from the respective Schmitt triggers switch to a logic 0 when the Schmitt triggers 54, 56 are in their set state.

The outputs of the NAND gates 64, 66 control the condition of a first pair of NAND gates 68, 70 and a second pair of NAND gates 72, 74. The output of the NAND gate 70 is applied to an inverting NAND gate 76 whose output determines the level on a forward inhibit terminal 77 while the output of NAND gate 72 is applied to an inverting NAND gate 78 whose output determines the level on a reverse inhibit terminal 79. The output of the NAND gate 64 is connected to one input of the NAND gate 70 and to one input of the NAND gate 74. The output of the NAND gate 66 is connected to one input of the NAND gate 68 and to one input 72. The output of the NAND gate 68 is connected to one input 70a of the NAND gate 70 while the NAND gate 70 output is connected to an input 68b of the NAND gate 68. Similarly, the output of NAND gate 72 is connected to an input 74a of the NAND gate 74 while the output of the NAND gate 74 is connected to the input 72b of the NAND gate 72. As will be well understood to those skilled in the art, the NAND gates 68, 70 form one pair of cross-connected NAND gates while the NAND gates 72, 74 form a second pair of cross-connected NAND gates.

When the motor is not operating, it will be clear from the foregoing description that the NAND gates 64, 66 have logic 1's applied to their inputs to result in logic 0's at their outputs. With logic 0's at the outputs of the NAND gates 64, 66, the outputs of the NAND gates 68, 70, 72, 74 will be logic 1's since each will have one input from one of the outputs of NAND gates 64, 66 which is a logic 0 and one input from the other cross-connected NAND gate which is a logic 1.

On starting, assuming a positive command signal to the amplifier 22 which results in a positive error signal to the forward phase shifting network and a positive output from the amplifier 52, the Schmitt trigger 54 will be triggered to change its output to the NAND gate 64 from a logic 1 to a logic 0. This changes the output of the NAND gate 64 from a logic 0 to a logic 1 providing two logic 1's on the inputs to the NAND gate 70 and two logic 1's on the inputs to the NAND 74. With two logic 1's on the inputs to the NAND gate 70, the output of the NAND gate 70 changes from a logic 1 to a logic 0 to change the output of the inverting NAND gate 76 and the output on forward inhibit terminal 77 to a logic 1. The terminal 77 is connected to the inhibiting control line 30 to enable the forward rectifier bridge when a logic 1 is thereon.

As the motor starts to operate, current will be sensed by the current sensing amplifier 60. When the armature current sensing amplifier 60 senses a positive current in the armature, its output becomes more negative to render the transistor 80 conductive to render transistor 82 conductive and to change the logic 1 on input 64b of the NAND gate 64 to a 0. This change in the amplifier output for current amplifier 60 does not effect the input to gate 66 from the amplifier, since a transistor 88 is not rendered conductive by a negative-going output from the amplifier 60.

When the input 64b of the NAND gate 64 changes to a logic 0 in response to a current signal, the output of the NAND gate 64 does not change, since its input from the Schmitt trigger 54 is a 0. Accordingly, there is no change in state in the cross-connected NAND gates 68, 70, and 72, 74. This condition will remain until the CEMF reduces the output from amplifier 52 to below the threshold level for Schmitt trigger 54. When the Schmitt trigger 54 is reset at this time, the input 64a to the NAND gate 64 changes from a 0 to 1 but, once again, this does not change the output of NAND gate 64 since the input 64b from the current sensing amplifier 60 is now a logic 0. Accordingly, the fact that the motor has now reached a speed where the CEMF results in a small output from the amplifier 52 does not change the state of the cross-connected NAND gates 68, 70 and 72, 74. As the motor is making a transition to a regenerating operation, the output from the amplifier 52 will change to a negative output showing that the error signal from the amplifier 22 to the phase shifting network is below that magnitude necessary to advance the triggering pulses for the SCR's to a point earlier than the necessary operating phase angle for effecting firing of the forward SCR's against the back biasing by the CEMF.

As this negative output from the amplifier 52 triggers the Schmitt trigger 56, the NAND gate 66 will have its input 66a changed from a logic 1 to a logic 0. This will change the output of the NAND gate 66 from a logic 0 to a logic 1. This will not change the output of NAND gate 72 of cross-connected NAND gates 72, 74 since the second input 72b of the NAND gate 72 has been a logic 0 because the output of NAND gate 74 is a logic 0 by reason of the logic 1 from the NAND gate 64 and the logic 1 which has existed on the output of NAND gate 72. As a result, no change in the outputs of forward NAND gate 76 or reverse NAND gate 78 occurs at this time.

A change in the level of the signals on the forward inhibit terminal and the reverse inhibit terminal will now occur when the armature forward current drops to 0 to cut off the transistors 80, 82 to change the input to input 64b of NAND gate 64 from a 0 to a 1. Since the voltage from the amplifier 52 is now negative, the Schmitt trigger 54 is applying a 1 to the other input of the NAND gate 64 so the output of NAND gate 64 changes from a 1 to a 0. This 0 is inverted by the NAND gate 70 to a 1 and in turn inverted by the NAND gate 76 to a 0 to apply a low level signal to forward bridge inhibit terminal to inhibit the forward bridge. The change in output of the NAND gate 64 to a 0 also changes the input of NAND gate 74 on input 74b from a 1 to a 0 to change the output of NAND gate 74 from a 0 to a 1 which in turn changes the output of NAND gate 72 from a 1 to a 0 which is inverted by the NAND gate 78 connected to the reverse inhibit terminal to a 1 to render the negative phase shifting circuitry effective to pulse the SCR's in the reverse bridge.

As the reverse bridge starts conducting, current will flow in a reverse or negative direction in the motor and this will produce a positive going output signal at the output of amplifier 60 to render transistor 88 conductive to change the input on input 66b of NAND gate 66 from a 1 to a 0. This will not change the output of NAND gate 66 since the NAND gate 66 already has a 0 applied on its input 66a by the negative voltage flip flop 56. The NAND gate 66 is now set so that the current has to return to 0 and the voltage to less than 1.5 volts negative before its output will change from a 1 to a 0 to effect a change in the output level at the reverse inhibit terminal. As the voltage drops to −1.5 volts from the CEMF error amplifier 52, the negative flip flop will be reset and will effect the application of a 1 at the input terminal 66a of the NAND gate 66 and when the current subsequently returns to 0 to cut off the transistor 88, the NAND gate 66 will have its input 66b changed from a 0 to a 1 to change its output to a 0. When the output of NAND gate 66 changes from a 1 to a 0, the output of NAND gate 72 will change from a 0 to a 1 which will be inverted to a 0 by the NAND gate 78 to provide a low level signal on the reverse inhibit bridge terminal. This resets the circuitry in the same condition as on starting and the circuitry will respond to signals in the same way as earlier described to effect an enabling of the regenerative bridge when it can be safely turned on to effect a regenerating operation and will effect a turning on of the forward rectifying bridge if the CEMF indicates a speed less than that called for by the command signal so as to render the forward bridge capable of conducting forward current at the triggering phase angle commanded by the command or error signal to the amplifier 22.

It can now be seen that the NAND gate 64 is set by the positive-going output of the amplifier 52 when the output therefrom goes positive in response to an error signal calling for positive (motoring) current. This enables the forward bridge. When the motor starts, the output of current amplifier 60 changes the input 64b in response to forward (positive) motoring current so that the gate 64 will not be reset until both the signal from amplifier 52 and the signal from amplifier 60 are changed to logic 1's to indicate that the regenerative bridge may be enabled if the signal from amplifier 52 has swung negative indicating that the CEMF is greater than the power wave at the gating angle for the SCR's in the forward bridge. If this is true, the NAND gate 66 is set and subsequently reset in the same manner as NAND gate 64 but in response to negative-going output from the amplifier 52 and negative current signal from the amplifier 60. The NAND gates 68, 70, 72 and 74 connected to the outputs of the gates 64, 66 provide logic means for enabling the forward bridge in response to the setting of NAND gate 64 in the presence of an output from the amplifiers 60, 52 signaling operation in a motoring direction and for enabling the regenerative bridge in response to the resetting of the NAND gate 64 and the setting of the NAND gate 66 by a change in output from the amplifier 52 indicating that regeneration is to occur. Similarly, the forward bridge will not be enabled until after the regeneration NAND gate has been reset and the output of amplifier 52 calls for motoring current, i.e., swings positive.

It will be understood by those skilled in the art that the adder 20 has one input which is preferably connected to a feedback tachometer generator 90 by a connection 91 so that the command signal applied to the speed control amplifier is preferably the difference between a feedback signal and the initial command signal. However, such a tachometer is not necessary for the utilization of the present invention.

It will be well understood by those skilled in the art that the motor control system may provide a negative polarity signal to the amplifier 22 if the system is also to be operable in a reverse direction.

When motoring in reverse, the forward generating bridge would operate in the same manner as the reverse SCR bridge did in the first described embodiment and the reverse SCR bridge will operate in the same manner as the forward SCR bridge.

In this situation, the forward SCR bridge is the regenerating bridge and the reverse SCR bridge operates to supply the motoring current. The gating processor 50 will operate in the same manner as in the forward direction except that the signal from the amplifier 22 on starting will now be a negative signal and the CEMF will be a signal of opposite polarity so the output of the amplifier 52 will have the opposite polarity output and the Schmitt trigger 56 will be initially triggered and the gating and logic sequence will be essentially the same but with the NAND gate 66 operating first in the sequence rather than the NAND gate 64. Also, the output of the current sensing circuit 60 will initially be a positive-going output to effect an enabling of the reverse bridge rather than the forward bridge to initiate motoring and the forward bridge will operate only during a regenerative condition.

Figure 8:
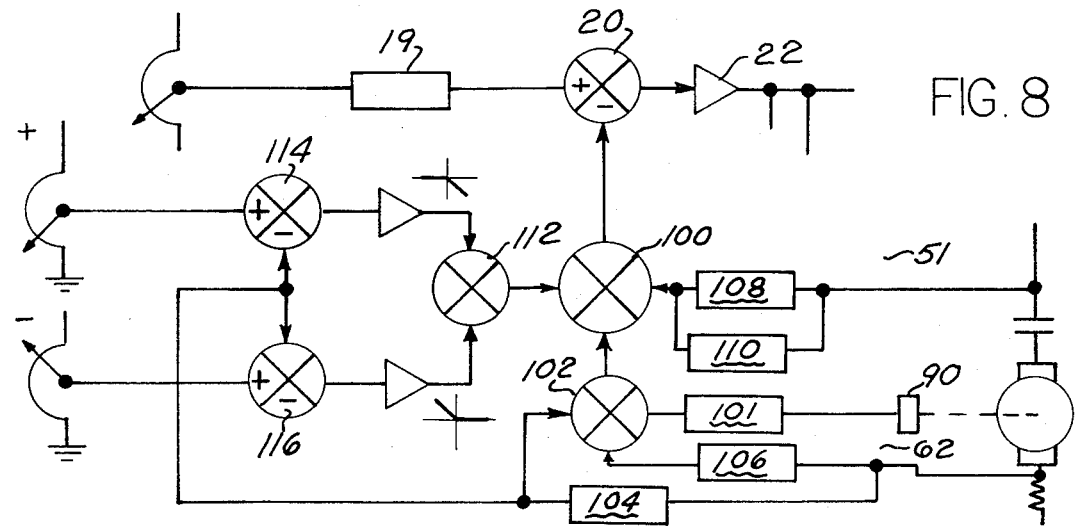
FIG. 8 is a schematic diagram of a control system having acceleration and current-limiting controls.

Acceleration control and current limiting will facilitate a smooth transition between forward and reverse speeds. FIG. 8 is a schematic diagram including positions of FIG. 1 with acceleration and current-limiting controls. Referring to FIG. 8, the feedback signal to the adder 20 may be from another adder 100 which sums signals derived from the armature current, the armature voltage and the speed tachometer 90. The output of tachometer 90 is applied through a speed feedback circuit 101 which supplies a motor speed signal to one input of an adder 102 which algebraically sums the speed signal with a motor current rate of change signal derived from a circuit 104 and a motor current signal derived from a circuit 106. The output of adder 102 is applied to one input of adder 100 to be algebraically summed with an armature voltage and rate of change of armature voltage signal derived from circuits 108, 110 and a current-limiting signal derived from an adder 112 which has two inputs connected to positive and negative motor current-limiting amplifiers 114, 116, respectively. The amplifiers 114, 116 each have inputs derived from respective adders 120, 122, each of which algebraically sums a motor current feedback signal and a reference signal from a respective one of positive and negative reference signal sources 124, 126, respectively. The amplifier 114 operates to limit forward current, while amplifier 116 operates to limit negative or reverse current. The amplifiers 114, 116 have transfer characteristics, as indicated at 128, 130 on FIG. 8.

The operation of the feedback circuits of FIG. 8 are more fully disclosed and described in my copending application Ser. No. 826,629, filed May 21, 1969, entitled "Controlled Velocity Drive" and assigned to the same assignee as the present invention, and reference to that application is made for a more detailed explanation of the feedback circuits.

What is claimed is:

1. In an electrical system comprising a motor, a cyclic power source, and means for conducting current between said power source and said motor, control apparatus comprising means for providing a motor speed signal, means for providing a signal of rate of change of motor armature voltage, means for combining said motor speed signal and said rate of change of motor armature voltage signal to provide an error signal, first means for supplying current to said motor from said source in response to said error signal when said motor is to operate in a motoring mode, second means for conducting current between said motor and said power source when said motor is operating in a regenerative mode, third means for selectively enabling said first means and disenabling said second means when said motor is to operate in a motoring mode and for disenabling said first means and enabling said second means when said motor is to operate in a regenerative mode comprising comparing means for comparing an input signal dependent on said error signal with a first feedback signal from said motor to said third means, said first feedback signal indicating the value of the counter-electromotive force of the motor to allow said comparing means to determine when said first means is not capable of conducting current flow to said motor in response to the error signal, said third means utilizing a second feedback signal from said motor to said third means indicating armature current in said motor to allow said third means to determine when armature current is substantially zero, said third means including means responsive to said comparing means and said second feedback signal to switch said motor being said motoring mode and said regenerative mode when concurrently said first means is incapable of conductive current flow to said motor in response to said error signal and the armature current in said motor is zero by disenabling said first means and enabling said second means.

2. Control apparatus as defined in claim 1 wherein said first and second means each comprises a conductive element periodically biased in a forward conductive direction by a forward voltage lobe of a respective polarity from said source and periodically reverse-biased by a respective voltage lobe of opposite polarity, and said conductive element is rendered conductive in response to a triggering pulse when biased in a forward direction and non-conductive by a reverse bias applied periodically to said element, said first means comprising means for changing the phase of a triggering pulse from the trailing end of the forward voltage lobe to an earlier phase in dependency on the value of said error signal and said second means comprising means for changing the phase of its triggering pulse from the leading end of its reverse voltage lobe to a later phase in dependency on the value of said error signal.

3. Control apparatus as defined in claim 1 wherein said first means comprises a conductive element which may be started into conduction at a trigger phase angle in response to a triggering signal when the voltage drop thereacross as a result of the forward bias by the power wave and the reverse bias by the armature voltage of the motor produces a forward bias across the conductive element.

4. An electrical system as defined in claim 3 wherein said power source provides a cyclic power wave whose voltage magnitude periodically reduces to zero and said first means is started into conduction at a trigger phase angle in response to said control signal and ceases to conduct each cycle, said first means being incapable of being started into conduction when the armature voltage of the motor is greater than the instantaneous value of the power wave, said third means comprises means for determining when the value of said power wave at the trigger phase angle becomes less than the value of the armature voltage of the motor.

5. Control apparatus as defined in claim 3 wherein said means for comparing comprises means for adding said signal indicative of the armature voltage of the motor in opposition to said input signal to provide an output signal which changes in polarity when the value of the forward bias from said power source at said trigger phase angle becomes less than the armature voltage and logic means responsive to one polarity of the signal to enable said first means and responsive to the second polarity of said signal to condition said third means to enable said second means and disable said first means upon detection by said third means of the armature current in the motor becoming zero.

6. An electrical system having a motor to be controlled in response to a control signal comprising means for producing a rate of change of motor armature voltage signal, means for providing a reference signal, summing means for combining said rate of change of motor armature signal with said reference signal to provide said control signal, first means responsive to said control signal for conducting a portion of a forward biasing power wave to said motor, the portion of said wave being conducted dependent upon the magnitude of a characteristic of said control signal, second means for conducting current from said motor to said power source, and third means for selectively enabling one of said first and second means and disabling another comprising first circuit means responsive to a feedback signal to said third means of the armature current in said motor being zero and second circuit means responsive to signals indicative of the relative magnitudes of said control signal and a feedback signal at said third means of the counter-electromotive force of said motor for enabling said second means and disabling said first means when the armature voltage of the motor becomes greater than the magnitude of the forward biasing power wave at which said first means would become conductive in response to said control signal, said first circuit means comprising a current indicating circuit having first and second outputs which indicate the direction of current flow in the motor, a comparing circuit having first and second outputs when the error signal commands conduction of the forward biasing portion of said power wave beginning at a phase angle where the magnitude is less than and greater than said armature voltage respectively, first logic means having set and reset conditions, second logic means having set and reset conditions, means connecting said first outputs to said first logic means to maintain said first logic means in a set condition in the presence of either of said outputs and otherwise in a reset condition, means connecting said second outputs to said second logic means to maintain the second logic means in a set condition in the presence of either of said second outputs and otherwise in a reset condition, and means responsive to the set condition of said first logic means and the reset condition of said second logic means to enable said first means and disenable said second means, and responsive to the set condition of said second logic means and the reset condition of said first logic means for enabling said second means.

7. Control apparatus as defined in claim 1 wherein said means responsive to said comparing means includes a first diode assembly connected to said third means and between said combining means and said first current supplying means and a second diode assembly connected to said third means and between said combining means and said second current supplying means to bypass said characteristic of an error signal from said first current supplying means to said third means in response to a "low" output signal from said comparing means to disenable said first current supplying means thereby.

8. Control apparatus as defined in claim 7 wherein said comparing means of said third means includes a first operational amplifier having one input connected to said first feedback signal of motor counter-electromotive force, another input connected to said error signal, and an output connected to a bistable hysteresis circuit, a second operational amplifier having one input connected to said second motor armature current feedback signal and an output connected to a logic circuit, said logic circuit being also connected to the output of said bistable hysteresis circuit to produce enabling and disenabling control signals to said first and second diode assemblies in response to said first feedback signal being greater than said error signal and said second feedback signal being substantially zero.

9. Control apparatus as defined in claim 8 including means for producing a signal of the rate of change of motor armature current, and wherein said combining means combines said rate of change of motor armature current signal with said motor speed signal and said rate of change of motor armature voltage signal to provide said error signal.

* * * * *

UNITED STATES PATENT OFFICE
CERTIFICATE OF CORRECTION

Patent No. 3,795,850            Dated March 5, 1974

Inventor(s) JAMES W. GRYGERA

It is certified that error appears in the above-identified patent and that said Letters Patent are hereby corrected as shown below:

Column 2, lines 58 and 59, "con-truction" should read -- construction -- . Column 3, line 31, "scr's" should read -- SCR's -- . Column 4, line 59, "interting" should read -- inverting -- . Column 5, line 44, "though" should read -- if -- . Column 9, lines 31 and 32, "posi-tions" should read -- portions -- . Column 10, line 30, "being" should read -- between -- . Column 11, claim 6, line 38, "at" should read -- to -- .

Signed and sealed this 13th day of August 1974.

(SEAL)
Attest:

McCOY M. GIBSON, JR.                C. MARSHALL DANN
Attesting Officer                   Commissioner of Patents